(12) United States Patent
Lissotschenko et al.

(10) Patent No.: US 6,421,178 B1
(45) Date of Patent: Jul. 16, 2002

(54) DEVICE AND METHOD FOR TRANSFORMING OPTICAL BEAMS

(75) Inventors: Vitalij Lissotschenko, Fasunenwegg, D 58730 Früudenberg; Alexei Mikhailov, Dortmund, both of (DE)

(73) Assignees: Vitalij Lissotschenko; Joachim Hentze, both of (DE)

( * ) Notice: Subject to any disclaimer, the term of this patent is extended or adjusted under 35 U.S.C. 154(b) by 29 days.

(21) Appl. No.: 09/657,762

(22) Filed: Sep. 8, 2000

Related U.S. Application Data

(63) Continuation of application No. PCT/EP99/01569, filed on Sep. 16, 1999.

(30) Foreign Application Priority Data

| Mar. 10, 1998 | (DE) | 198 10 245 |
| May 6, 1998 | (DE) | 198 20 154 |

(51) Int. Cl.$^7$ .................. G02B 27/096; F21V 5/02
(52) U.S. Cl. .............. 359/559; 359/619; 359/624; 359/641; 359/669; 359/900; 362/259
(58) Field of Search ............ 359/559, 562, 359/624, 627, 628, 720, 851, 641, 619, 621, 622, 623, 558, 900, 668, 669; 362/259; 372/43, 50

(56) References Cited

U.S. PATENT DOCUMENTS

| 4,306,278 A | * 12/1981 | Fulton et al. ........... 372/75 |
| 4,475,027 A | 10/1984 | Pressley ............... 219/121 |
| 5,333,077 A | * 7/1994 | Legar et al. ........... 359/619 |
| 5,390,024 A | 2/1995 | Wright ................ 356/376 |
| 5,572,367 A | 11/1996 | Jung et al. ........... 359/708 |
| 6,115,185 A | * 9/2000 | Du et al. ............. 359/628 |

FOREIGN PATENT DOCUMENTS

| DE | 195 14 625 | 10/1996 | .......... G02B/27/09 |
| DE | 195 44 488 | 6/1997 | .......... G02B/27/30 |
| DE | 196 23 762 | 12/1997 | .......... G02B/27/09 |
| WO | Wo 96/34441 | * 10/1996 | |
| WO | WO 98/08128 | 2/1998 | .......... G02B/27/09 |

OTHER PUBLICATIONS

R. P. Edwin "Stripe Stacker for use with Laser Diode Bars" Jan. 2, 1995 Optics Lett. 20(2), 223.

* cited by examiner

Primary Examiner—Cassandra Spyrou
Assistant Examiner—John Juba, Jr.
(74) Attorney, Agent, or Firm—Hoffman Wasson & Gitler, PC

(57) ABSTRACT

The invention concerns a device for optically transforming at least a radiation beam having a width extending in the plane X-Y. The device including optical elements provided with optically active interfaces, arrange in the radiation path. So as to obtain a more homogeneous intensity distribution in the output radiation beam and minimize internal losses, the invention includes at least one optical element in the form of a continuous angular transformation element including an optical interface having, along the x axis, an inclination continuously varying in the radiation direction, relative to the Y axis. The invention further concerns a method for continuously transforming a beam width extending in the X-Y plane, at least in the direction X, with defined divergence distribution.

11 Claims, 3 Drawing Sheets

DEVICE AND METHOD FOR TRANSFORMING OPTICAL BEAMS

CLAIM OF PRIORITY

This application claims priority to German Application No. 198 10 245.3 filed on Mar. 10, 1998 and German Application No. 198 20 154.0 filed on May 6, 1998 and a continuation to PCT Application No. PCT/EP99/01569 on Sep. 16, 1999.

FIELD OF THE INVENTION

The invention concerns a device for optical beam transformation of one or more ray bundles, of which some have an oblong cross-section in the x-y-plane, using optical elements made up of optically active interfaces arranged along the beam path. In addition, an element of the invention is a method that concerns the optical transformation of the cross-section of one or more ray bundles of which some have an oblong cross-section in the x-y-plane and show a well-defined convergence distribution.

1. Prior Art

A basic problem in the coupling of high-energy laser beams with fiber optics consists in that the geometric shapes of the beam cross-sections generally differ considerably from the shape of the active fiber cross-section. As an example, semiconductor laser bars, which are found in ever-increasing distribution, have a band-shaped, oblong light emission area, that is, a quasi-linear aperture in which the individual narrowly limited emission centers lay side-by-side in, for example, the x-direction. The divergence of the elementary ray bundles starting out from the emission centers is constant but is considerably smaller in the lengthwise direction of the beam profile, that is, in the x-direction in the coordinate system introduced at the beginning, than in the y-axis lying orthogonal to it. For this reason, of lengthwise axis is from here on referred to as the "slow axis" while the y-axis is referred to as the "fast axis".

Under the conditions described above, relatively good collimation in the fast axis is quite possible, but the linear profile remains linearly stretched out as before. Limited by this characteristic asymmetry and also in view of the geometric extension of the beam cross-section as well as in view of the divergence distribution, the ray bundle is not amenable for being focused on a symmetric spot suitable for coupling with a circular-symmetric fiber cross-section. Specifically, the numerical aperture of the fiber would then be exceeded in each case. Apart from the fact that the beam cross-section would be even greater at the focus than the active cross-section of the fiber core due to the high divergence, the total reflection angle between core and fiber would be exceeded so that light crosses over into the cladding resulting in considerable loss.

In addition, due to the abovementioned difference between the symmetries of the beam cross-section and the fiber core, relatively large unilluminated zones would appear in the fiber cross-section. This also applies incidentally to the use of laser bar piles, known as "stacks", in which a number of linear shaped emitters are arranged one on top of another in a stack. The light given off by these is distributed over a larger, mostly rectangular cross-section. Between each of the individual lines however are emissions-free zones, which amounts to having a nonhomogeneous intensity distribution.

In order to achieve a more efficient use and thereby a higher transfer capacity by way of a homogeneous illumination of the fiber cross-section, various solution approaches are already known in the state of the art. With the known arrays or devices, an incoming ray bundle with a beam cross-section stretched out in the x-y-plane is first of all decomposed in one direction, for example along the x-axis, into discrete partials ray bundles. Next, these partial ray bundles are regrouped in the y-direction by refractive or reflective elements so that a desired outgoing cross-section is achieved. For example, in DE 195 14 625 C2 it is proposed that linear shaped sections of the given linear beam cross-section be regrouped on top of one another in a quadratic or rectangular area. With the output ray bundle formed in this manner, a better filling of the circular fiber cross-section area is made possible, whereby a higher capacity is transmittable than with simple collimation or focusing. It is obvious however that the limits of this method or the devices used in it are reached rather quickly since further emission-free zones remain between the regrouped linear sections.

The aperture of the optic fiber is consequently not uniformly illuminated. Depending on the type of emission source, under high transmission capacity a more rapid aging of the fiber can result from local intensity overload. If the local energy density exceeds the destructive threshold of the fiber material, destruction of the fiber can occur.

A further disadvantage comes about in that in decomposing the input ray bundles into discrete partials ray bundles, unavoidable diffraction effects occur at the separation points, which leads to losses. This applies equally to the use of reflective elements, as e.g. stepped mirrors, as well as refractive elements, as e.g. stepped prisms or the like. The efficiency would naturally be likewise limited by these losses.

Another approach is described in DE 196 23 762 A1. By means of the resulting device, a linear input beam profile is transformed into a circular-symmetric beam field by mounting three cylindrical lenses perpendicular to each other in series. Obviously, the output beam for this device has a ring-shaped profile. That means that practically the entire circular inner area, in contrast, represents a dead zone, which is not illuminated. Due to the resulting inhomogeneity of the energy distribution over a fiber cross-section, the transmission capacity is limited just as in the previously mentioned device.

2. Brief Description of the Invention

Starting from the problem described above, the current invention has as its basis the task of producing a beam transformation device as well as a method for beam transformation that makes possible a well-defined intensity distribution in the output ray bundle for which small internal losses occur. In particular, the device and the method should be capable of better coupling light from a light source with a strongly asymmetric beam cross-section, for example from a laser or a laser bar stack with one or more optic fibers.

As a solution to this task, the invention proposes a device for optical beam transformation in which an optical element is shaped as a continuous angle transformation element that has an optical interface that, along the x-axis, has a continuously varying inclination in the beam direction relative to the y-axis.

For the angle transformation element according to the invention, one is dealing with a novel reflective or refractive component whose optically active interface has the form of a surface twisted around an x-axis running at right angles to the beam axis. Pictorially, such a surface comes about if one where to take a surface lying in the x-y-plane and twist the outer ends, for example those in the x-direction, in opposite rotational directions so that the x-axis itself forms the:untwisted, neutral fiber. Thereby the possibility also exists to realize continuously increasing or decreasing inclination angles over the span of the component in the x-direction or also to set variable inclination angles sectionwise in different directions. While the first-mentioned shape is similar to a "propeller-like" surface, the second shape has a conic-section-like, furrowed surface.

The angle transformation element according to the invention can equally well be designed as a reflective or refractive element. The refractive element forms virtually a prism element with continuously varying base angles at right angles to the beam direction. With a wave-like progression of the inclination angles, it is possible, for example, to compensate for the intensity pulse with laser diode bars. This is a matter of aberrations of the emitter orthogonal to the expansion direction, which is referred to as "smile" distortion.

This distortion comes about from the warping of the semiconductor chip in its fabrication. As a result, the light output surface, and thereby the beam cross-section, maintains a curved course. If the course of the inclination angle of the angle transformation element is determined at each point by the local deviation of the beam profile from a straight one, a compensation for the distortion is achieved. This matching is designed so that the local inclination angle for a given x-coordinate is dependent at each point on the local deviation, $\Delta y$, of the beam source from a linear course. In this way, a well-defined linear beam profile is obtained at prescribed intervals on the output side.

The function of the angle transformation element according to the invention can be particularly well clarified using the illustration wherein a radiation bundle, propagating in the z-direction with an oblong beam cross-section in x-y-plane, is formed from an infinite number of elementary beams with infinitesimal cross-sections, which emerge from elementary points lying in the x-y-plane. With the angle transformation element according to the invention, the elementary ray bundles are redirected in the y-z-plane relative to the beam axis dependent upon their x-coordinate. The transformation of a linear beam coordinate into a rectangular coordinate attained in this manner is continuous, that is to say it follows a continuous function. In comparison to a discontinuous decomposition into separate partial ray bundles, this has the advantage that no losses come about at discontinuous transitions from front edge dispersion or the like. The ray bundle with continuously transformed angles is suitable for a further continuous operation.

A particularly advantageous design for a beam transformation device according to the invention envisions an arrangement in which in sequential order along the beam path a first angle transformation element with one or more optical interfaces, which, along the x-axis, has a continuously varying inclination in beam direction relative to the y-axis, a Fourier transform array and a second angle transformation element with one or more optically active interfaces, which, along the y-axis, has a continuously varying inclination in beam direction relative to the x-axis are arranged, whereby the first and second angle transformation elements are positioned in the focal plane and the back focal plane of the Fourier transform array.

For the Fourier transform array is meant a so-called 1*f–1*f array. Here, the object is at the focal point of the lens; the Fourier transformation of the object is at the back focal point behind the lens. This array leads to a transformation of a given divergence on a surface.

With this transformation device according to the invention, a ray bundle stretched out in the x-y-plane, which has, in particular, an oblong beam cross-section in the x-direction and demonstrates a well-defined divergence distribution, can be transformed so that elementary beams neighboring in the x-direction are redirected in the y-direction relative to the beam axis at a beam angle continuously varying with their x-coordinate while maintaining their respective divergences, by a continuous Fourier transform, the elementary beams are transformed into a y-coordinate as a function of their respective divergence and the elementary beams, which vary continuously in their divergence as a function of their y-coordinate, are made parallel relative to the beam axis.

The transformation according to the invention of a ray bundle with beam cross-section stretched out in the x-y-plane, for example for lasers with a linear beam cross-section extended in the x-direction, provides that the successive infinitesimal elementary ray bundles in the beam cross-section are respectively redirected relative to each other through a beam angle continuously dependent on their x-coordinate. Since the first angle transformation element is positioned at the focal length of a Fourier transform array, for example a simple convex lens, a convex lens array, or a crossed cylindrical lens array, an output ray bundle with divergence angle continuously varying in the y-direction is produced through the continuous Fourier transform at the back focal point. This spatial divergence distribution is compensated for by the second angle transformation element positioned there. With this, the outgoing ray bundle is virtually parallel to the beam axis.

An intrinsic advantage of the device, according to the invention or the method conforming to it lies in that the intensity distribution over the outgoing ray bundle can be tuned in a well-defined manner. Thus a beam source with strongly asymmetric cross-section aspect ratio, for example with linear beam profile, is transformable into an output beam cross-section with a more uniform aspect ratio and a homogeneous intensity distribution. For a source with optical symmetry, for which the product of the size of the oblong source and the numerical aperture is constant, the result is a rectangular output beam cross-section. Its width in the x-direction is dependent upon the focal length of the Fourier transform array and the numerical aperture of the source in the x-direction. Its y-dimension is dependent upon the product of the divergence in the x-direction and the focal length of the Fourier transform array. It is possible, for example, with this to transform a source with linear asymmetric beam cross-section into a virtually rectangular output cross-section with symmetric aspect ratio. This is particularly well suitable for coupling to an optical fiber, which likewise has a symmetric cross-section.

Based on the characteristics of the Fourier transform, a stack, that is a stack of several linear sources arranged in parallel, can likewise be transformed into an output cross-section with homogeneous intensity distribution. In regard to a single line, its symmetry, that is the aspect ratio, would be only slightly changed. Thus a transformation device according to the invention can be used for a single laser bar as well as for a laser diode stack without essentially reducing the area fill factor when coupling to an optical fiber.

The invention, first of all, makes possible a well-defined allocation of the intensity distribution in the output beam cross-section. In this way, as described above, a single as well as several input ray bundles can be transformed into a single or also several homogeneously illuminated output beams. With a corresponding arrangement of the angle transformation elements with a nonlinear progression of the inclination angle, well-defined inhomogeneous intensities can also be produced in the output ray bundle. In this way, well-defined intensity distributions can be produced, such as those desired, for example, for certain surface working procedures.

For practicality, the angle transformation elements according to the invention are designed as one-piece refractive elements, which, for example, are produced from quartz by micro-ultrasonic machining. With a view toward minimizing additional angular errors, which make themselves noticeable as undesired additional angles at increasing inclination orthogonal to them, a single angle transformation element can be designed as an array of component angle transformation elements arranged side-by-side. These have essentially the same shape. With a sufficiently small aperture in the x-direction, the undesired additional angles can always, however, be kept small in comparison to the actual inclination or deflection angle.

As an alternative, the angle transformation element can be designed as a mirror element with reflective interfaces.

For optimal matching to the respective characteristics of the ray bundle cross-section, the individual component angle transformation elements in an angle transformation element array can have a different inclination progression relative to one another.

The transformation lens array can equally well have conventional convex lenses as also crossed cylindrical lenses or convex lens or cylindrical lens arrays. Among others, the possibility presents itself to transform one or more input ray bundles into one or more output ray bundles. In some cases, the cylindrical lens array can also contain cylindrical lenses of varying thickness.

With the transformation device according to the invention, any oblong ray bundle can be transformed. For example, all types of laser arrays are appropriate as beam sources. Based on the beam geometry, application to excimer lasers and semiconductor laser bars or laser diode stacks is particularly advantageous. In some cases, these lasers are provided with front-end collimators of crossed cylindrical lenses or cylindrical lens arrays.

By employing many angle transformation elements and/or lens arrays according to the invention correspondingly many output ray bundles can be produced.

It is further particularly advantageous if the beam transformation device is designed as an optical hybrid chip, in which the optical elements are bonded to a one-piece base plate. In the base plate, which consists, for example, of quartz, mounts are formed to size for seating the optical elements. The entire device is then contained in one unit in which the individual components are bonded with high precision relative to one another.

BRIEF DESCRIPTION OF THE DRAWINGS

The invention is explained in more detail in the following with the use of figures. They show, in particular.

DETAILED DESCRIPTION OF A PREFERRED EMBODIMENT

Figure 1:
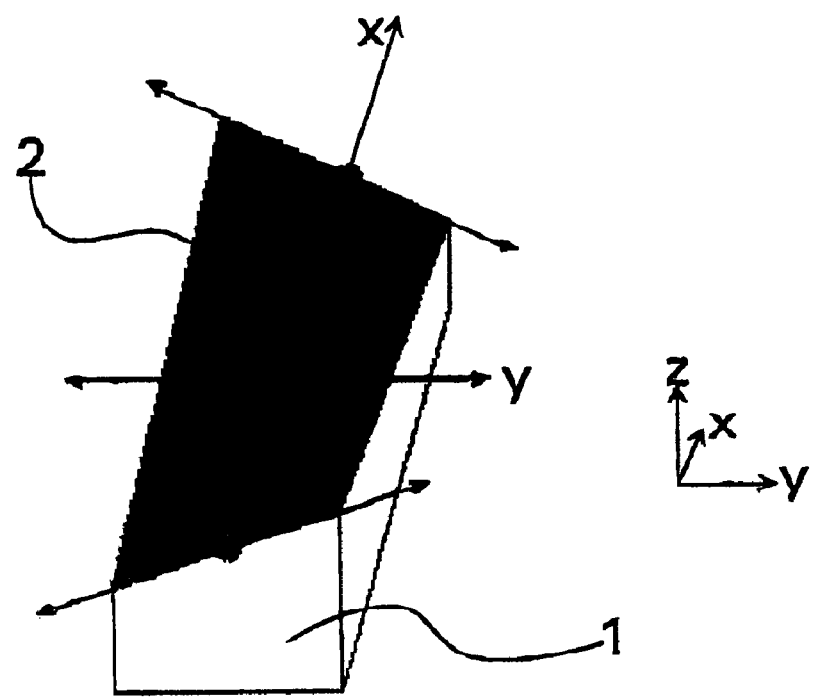
FIG. 1 an angle transformation element according to the invention presented in perspective.

Referring now to FIG. 1, the angle transformation element according to the invention, presented as a whole, is given the reference number 1. It is designed preferentially as a refractive element consisting of quartz or glass, for example. In this presentation, the optically active interface formed according to the invention faces upward—in the z-direction—and is itself indicated with the reference number 2.

The optically active interface 2 has the shape of a ribbon stretched out in the x-direction that is twisted around the x-axis. This produces along the x-axis a continuously varying inclination of the local surface normals in the beam direction relative to the y-axis. It can also be simply said that the optical interface 2 is twisted "like a propeller".

The beam direction in this representation lies along the z-axis.

Figure 2:
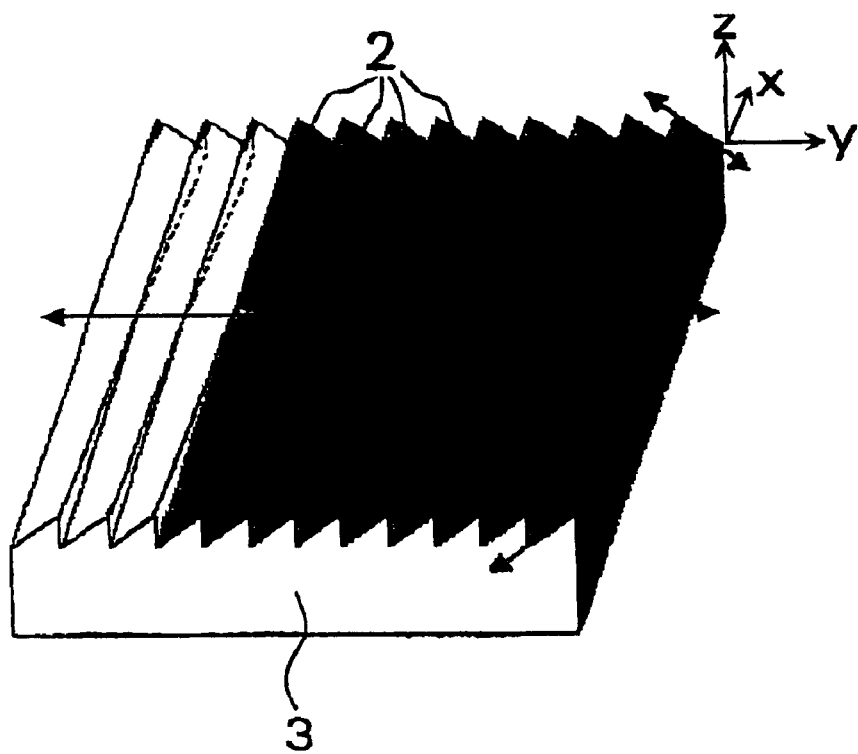
FIG. 2 an angle transformation array according to the invention presented in perspective.

Referring now to FIG. 2. FIG. 2 illustrates, in the same representation as FIG. 1, an array 3 of angle transformation elements according to the invention having optically active interfaces 2 arranged parallel side-by-side in the y-direction. This array 3 is preferably prepared as a one-piece element, made from quartz for example.

Figure 3:
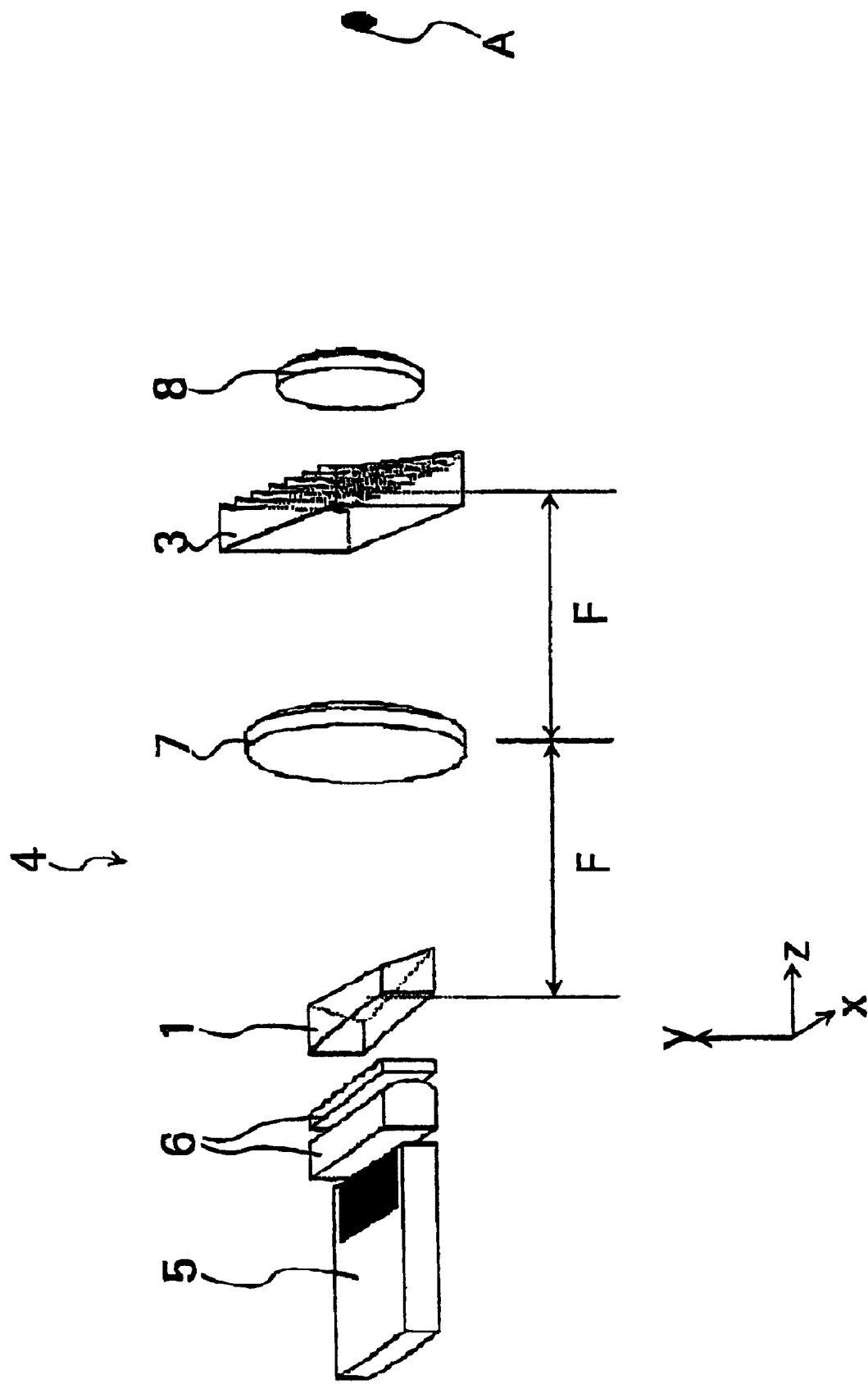
FIG. 3 a beam transformation device according to the invention presented schematically.

FIG. 3 shows in a schematic representation a beam transformation device according to the invention for transforming a linear input ray bundle into a rectangular output ray bundle. This beam transformation device as a whole is given the reference number 4.

Here, arranged directly in front of a laser bar 5 with a linear beam cross-section extending in the x-direction, is a collimator 6 consisting of an array of crossed cylindrical lenses. In front of this in the beam direction, thus in the z-direction, is the first angle transformation element 1 according to the invention as shown in FIG. 1.

The angle transformation element 1 is located in the focus F of the Fourier transform array 7, which in the design presented is a convex lens. It can however just as well be made using an array of crossed cylindrical lenses or the like.

Behind the Fourier transform array 7 in the z-direction, an angle transformation element array 3 is located in its back focal plane as the second angle transformation element, as shown in FIG. 2. Behind that, an arbitrary focusing device 8 is arranged for focusing the output ray bundle A.

Figure 4:
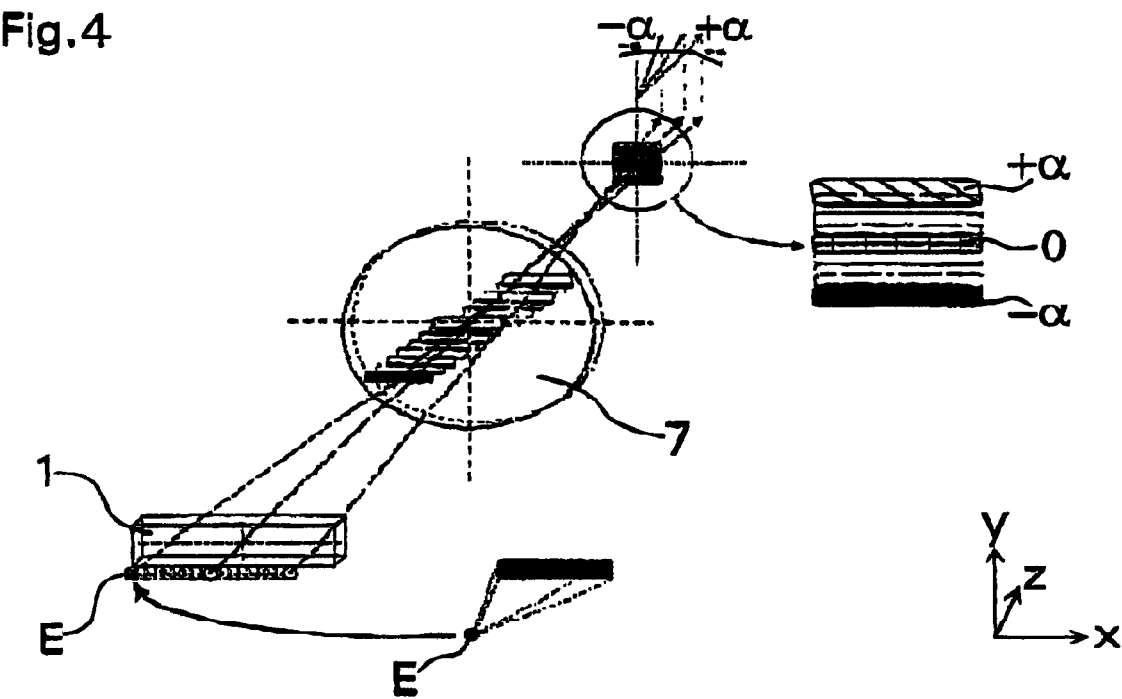
FIG. 4 a schematic representation of the first angle transformation element of the beam transformation device according to FIG. 3.

In FIG. 4, the mode of operation is clarified for the first angle transformation element 1 together with the Fourier transform array 7 as in FIG. 3.

The input ray bundle stretched out in the x-direction is pictured as an infinite number of elementary rays or elementary ray bundles E lying side-by-side in the x-direction. Each of these bundles E has the given divergence distribution indicated below in the drawing. The divergence after collimation is small in the y-direction (fast-axis), and larger by comparisons in the x-direction (slow-axis).

The schematically drawn, but in reality infinitesimal, elementary bundle E, which in the representation is on the left within the input ray bundle, is redirected downward by the angle transformation element 1 according to the invention through an angle determined by the local inclination of the angle transformation element 1 while maintaining its divergence along the beam direction in the y-z-plane. From left to right along the x-axis, the elementary bundles are redirected upward through a continuously varying angle dependent upon their x-coordinate. The contiguous spatial distribution in the x-direction is transformed in this way by the angle transformation element 1 according to the invention into a beam angle distribution.

The continuous radiation field along the diagonal is bundled by the Fourier transform array 7 into a rectangular output beam cross-section.

Above right, the output beam cross-section is shown in enlargement. The intensity is distributed homogeneously throughout it. The divergence is indicated by the different hatch lines, which above and below are oppositely running diagonals. For each y-coordinate, there is a constant divergence angle $-\alpha$ that varies over the beam cross-section from $-\alpha$ to $+\alpha$.

Figure 5:
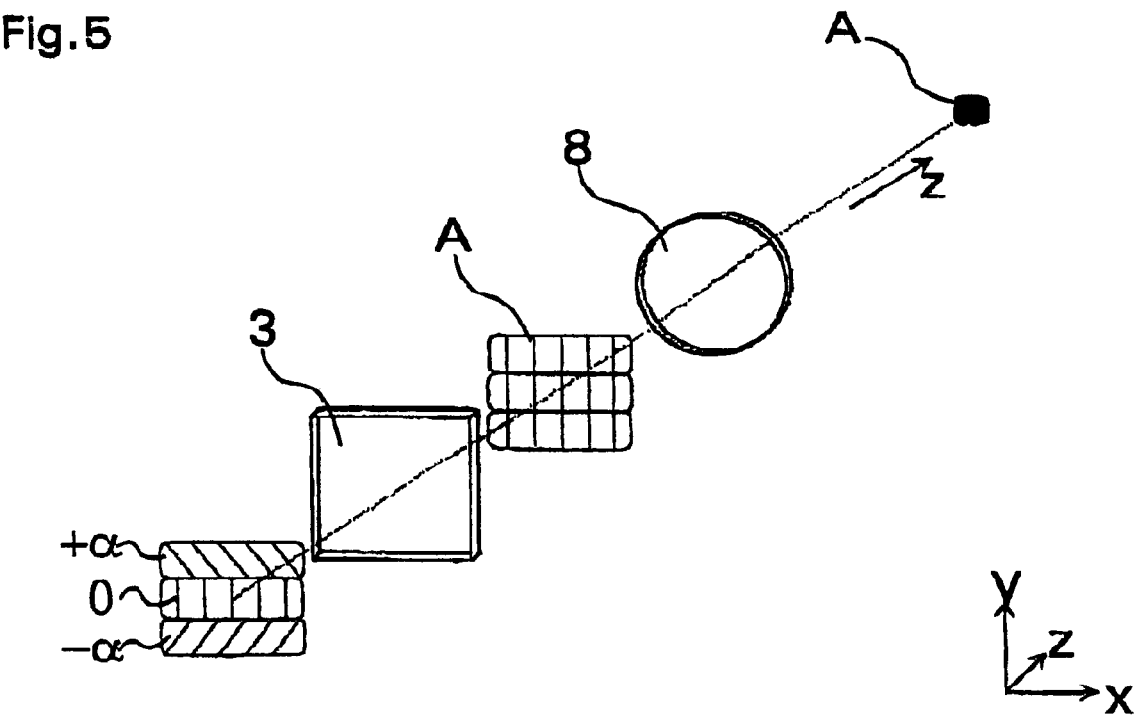
FIG. 5 a schematic representation of the second angle transformation element of the beam transformation device according to FIG. 3.

In FIG. 5, it is shown how the output ray bundle from FIG. 4, with divergence in the y-direction continuously varying from $-\alpha$ to $+\alpha$, is transformed by the second angle transformation element 3, which is designed as an array, so that the output ray bundle, which is designated as A, not only has a homogeneous intensity distribution but also is parallel to the z-axis. That means that the spatial divergence distribution generated by the Fourier transform is in turn compensated for by the angle transformation element 3 according to the invention.

The particular advantage of the output ray bundle A consists in that it is rectangular with a uniform aspect ratio and therefore has a homogeneous intensity distribution. A coupling to the circular fiber cross-section of an optic fiber is thereby possible with high efficiency.

A further fundamental advantage of a beam transformation device 4 according to the invention consists in that it is very tolerant against improper positioning of the beam source 5 in the x- or y-direction. That is to say, an improper positioning of the input ray bundle E is perceptible as only a small displacement of the output ray bundle A. That brings with it the essential advantage that a number of laser bars 5 can be arranged piled up in the y-direction as a stack whereby the total output of all ray bundles E being emitted are homogeneously combined in one output ray bundle A. In this way, the highest power densities can be efficiently coupled to an optic fiber.

What is claimed is:

1. A device for optical beam transformation of one or more ray bundles having an oblong beam cross-section in the x-y-plane using optical elements that have optically active interfaces arranged along the beam path, comprising:

at least one optical element designed as a continuous angle transformation element having an optical interface that, along the x-axis, has a continuously varying inclination in the beam direction relative to the z-axis direction, and causes a continuously varying inclination of the beam direction with respect to the y-axis;

at least one optical element including a first angle transformation element with one or more optical interfaces, which, along the x-axis, has a continuously varying inclination in beam direction relative to the y-axis;

a Fourier transform array having a back focal plane; and a second angle transformation element with one or more optically active interfaces, which, along the y-axis, has a continuously varying inclination in beam direction relative to the x-axis; whereby said first angle transformation element and second angle transformation element are each arranged and positioned in one of a front focal plane and said back focal plane of said Fourier transform array.

2. The device according to claim 1, characterized in that the angle transformation element has a nonlinear inclination progression.

3. The device according to claim 1 characterized in that said angle transformation elements each have a number of individual angle transformation elements.

4. The device according to claim 1 characterized in that said Fourier transform array has a convex lens.

5. The device according to claim 1 characterized in that said Fourier transform array has a lens array.

6. The device according to claim 1 characterized in that said Fourier transform array has crossed cylindrical lenses.

7. The device according to claim 1 characterized in that said Fourier transform array has a cylindrical lens array.

8. The device according to claim 1 characterized in that in front of said angle transformation element one or more laser sources are arranged.

9. The device according to claim 8 characterized in that said laser source is one or more laser bars that have a linear light emission surface stretched out in the x-direction.

10. The device according to claim 9 characterized in that said laser source has a laser bar stack in which a number of laser bars are stacked parallel in the y-direction.

11. A method for transformation of the beam cross-sections of one or more ray bundles that, in the x-y-plane, have an oblong beam cross-section, at least in the x-direction, and demonstrate a well-defined divergence distribution, the method comprising:

redirecting elementary beams neighboring in the x-direction in the y-direction relative to the beam axis at a beam angle continuously varying with their x-coordinate while maintaining their respective divergences;

said elementary beams being redirected by a continuous Fourier transform, said elementary rays being transformed into a y-coordinate as a function of their respective divergence; and said elementary rays, varying continuously in their divergence, dependent upon their y-coordinate, are made parallel relative to the beam axis.

* * * * *